United States Patent [19]

Shirakawa

[11] Patent Number: 4,498,034
[45] Date of Patent: Feb. 5, 1985

[54] MOTOR SPEED CONTROL CIRCUIT
[75] Inventor: Masami Shirakawa, Tokyo, Japan
[73] Assignee: Sony Corporation, Tokyo, Japan
[21] Appl. No.: 202,061
[22] Filed: Oct. 29, 1980

Related U.S. Application Data

[63] Continuation-in-part of Ser. No. 948,406, Oct. 4, 1978, abandoned.

[30] Foreign Application Priority Data

Oct. 11, 1977 [JP] Japan ................. 52-121765

[51] Int. Cl.³ .......................................... H02P 5/40
[52] U.S. Cl. ......................... 318/314; 318/318; 318/327; 318/341
[58] Field of Search ............... 318/314, 318, 327, 305, 318/310, 341

[56] References Cited

U.S. PATENT DOCUMENTS

| | | | |
|---|---|---|---|
| 2,782,355 | 2/1957 | Wilcox | 318/314 |
| 3,008,075 | 11/1961 | Scott | 318/314 |
| 3,086,157 | 4/1963 | Branco | 318/318 |
| 3,110,853 | 11/1963 | Jones | 318/314 |
| 3,268,788 | 8/1966 | Branco | 318/314 |
| 3,331,006 | 7/1967 | Strand et al. | 318/318 |
| 3,361,949 | 1/1968 | Brown et al. | 318/314 |
| 3,569,808 | 3/1971 | Goto | 318/318 |
| 3,696,278 | 10/1972 | Kuniyoshi et al. | 318/327 |
| 3,843,914 | 10/1974 | Carlson et al. | 318/341 |
| 4,223,261 | 9/1980 | White | 318/314 X |
| 4,227,137 | 10/1980 | Hartman | 318/327 X |
| 4,271,382 | 6/1981 | Maeda et al. | 318/314 X |
| 4,278,925 | 7/1981 | Minakuchi | 318/314 |

OTHER PUBLICATIONS

*Modern Applications of Linear IC's*, TAB Books, Blue Ridge Summit, Pa., 2nd printing, Jan. 1976, pp. 218–219.

Primary Examiner—B. Dobeck
Attorney, Agent, or Firm—Lewis H. Eslinger; Alvin Sinderbrand

[57] ABSTRACT

A motor speed control circuit, for example, for the turntable drive motor of a phonograph record player, is of the type having a phase-locked loop including a frequency-divider with a dividing ratio which is changeable for altering the rotational speed of the motor, for example, so as to selectively establish turntable speeds of 45 rpm and 33⅓ rpm, and has the gain of one of the components of the phase-locked loop, such as, the servo-amplifier, the loop filter or the phase comparator, varied in accordance with changes in the dividing ratio of the frequency-divider so that the loop gain of the phase-locked loop is maintained substantially constant regardless of the rotational speed of the motor.

7 Claims, 5 Drawing Figures

MOTOR SPEED CONTROL CIRCUIT

This a continuation-in-part of U.S. patent application Ser. No. 948,406, filed Oct. 4, 1978, now abandoned.

BACKGROUND OF THE INVENTION

1. Field of the Invention

This invention relates generally to motor speed control circuits and, more particularly, is directed to improvements in motor speed control circuits of the type having a phase-locked loop including a frequency-divider with a changeable dividing ratio for selecting the rotational speed of the controlled motor.

2. Description of the Prior Art

It is known to provide a motor speed control circuit with a phase-locked loop (PLL) for the turntable drive motor of a phonograph record player, and in which a frequency-divider included in the phase-locked loop has its dividing ratio changed for altering the rotational speed of the controlled motor, for example, to selectively establish a turntable speed of 45 rpm or 33⅓ rpm. However, in the existing motor speed control circuits of the described type, the loop gain of the phase-locked loop varies in accordance with changes in the selected rotational speed of the controlled motor. Such variation of the loop gain results in changes in the natural oscillation frequency and damping factor of the motor speed control system so that the response speed and transient response characteristic are not uniform for the various possible rotational speeds of the controlled motor. By reason of the foregoing, in a phonograph record player with the described motor speed control circuit, there is a difference between the fidelity of reproduction when the turntable is rotated at 45 rpm and at 33⅓ rpm.

OBJECTS AND SUMMARY OF THE INVENTION

Accordingly, it is an object of this invention to provide an improved motor speed control circuit that avoids the previously mentioned problems associated with the prior art.

More specifically, it is an object of this invention to provide a motor speed control circuit with a phase-locked loop which is capable of maintaining any one of a plurality of motor speeds, and in which the loop gain of the circuit is maintained constant regardless of the motor speed.

In accordance with an aspect of this invention, a motor speed control circuit comprising a phase-locked loop composed of a plurality of components including a frequency-divider with a dividing ratio which is changeable for altering the rotational speed of the controlled motor, is further provided with means for varying a gain of another of the components of the phase-locked loop in accordance with changes in the dividing ratio of the frequency-divider so that the loop gain of the phase-locked loop is maintained substantially constant regardless of the rotational speed of the motor. The component of the phase-locked loop which has its gain varied with changes in the dividing ratio, as aforesaid, may be a servo-amplifier for driving the motor, a phase comparator which compares an output of the frequency-divider with a reference frequency from a reference oscillator, or a loop filter constituted by an active RC filter.

The above, and other objects, features and advantages of the invention, will be apparent in the following detailed description of illustrative embodiments thereof which is to be read in connection with the accompanying drawings.

DESCRIPTION OF THE PREFERRED EMBODIMENT

Figure 1:
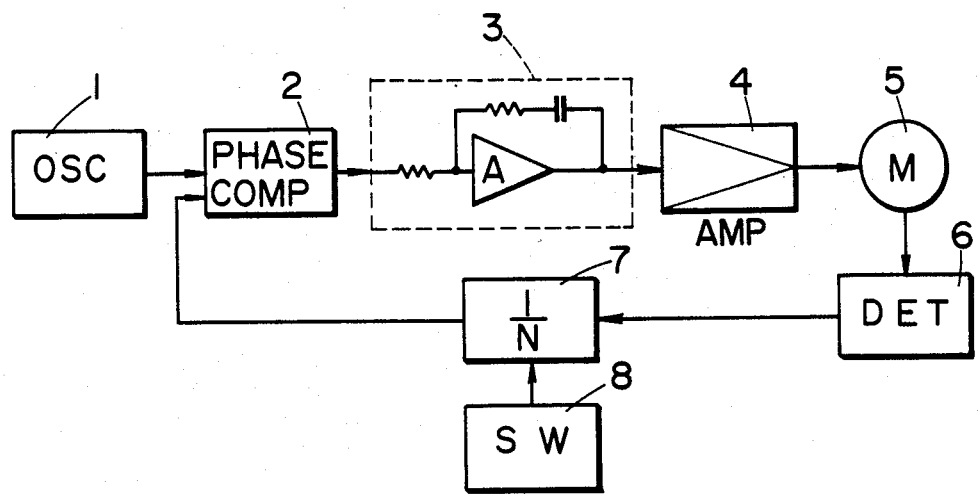
FIG. 1 is a block diagram illustrating a motor speed control circuit according to the prior art.

Before proceeding to a detailed description of the present invention and in order to enhance the understanding thereof, the problems solved by the invention will be discussed with reference to a motor speed control circuit according to the prior art, as illustrated on FIG. 1. Such prior art motor speed control circuit is shown to be of the type having a phase-locked loop and which generally comprises a reference frequency oscillator 1, a phase comparator 2, a loop filter 3, a servo-amplifier 4, a controlled motor 5, for example, for driving the turntable of a phonograph record player, a rotational speed detector 6, a frequency-divider 7 with a changeable dividing ratio, and a motor speed change-over switch 8 for changing the dividing ratio.

In the motor speed control circuit according to the prior art, the detector 6 suitably provides a pulse signal at a frequency corresponding to the rotational speed of motor 5. The frequency-divider 7, which may be constituted by a programmable counter, is effective to divide the frequency of the pulse signal from detector 6 by a selected dividing ratio N, in which N is an integer, and the resulting divided pulse signal is supplied to one input of phase comparator 2 which, at another input, receives a reference signal from oscillator 1. Phase comparator 2 produces an error voltage in proportion to the phase difference, if any, between the reference frequency or oscillation from oscillator 1 and the divided pulse signal from frequency divider 7. Such error voltage from comparator 2 is supplied to servo-amplifier 4 through filter 3 which eliminates higher harmonics and noise components. Finally, servo-amplifier 4 produces a control voltage in accordance with the error voltage applied thereto through loop filter 3, and motor 5 is controlled by the control voltage from amplifier 4 so as to rotate at a constant predetermined rotational speed. When the rotational speed of motor 5 is to be changed, for example, when the motor is used for driving the turntable of a phonograph record player which is to be selectively rotated at either 45 rpm or 33⅓ rpm, switch 8 can be manually or otherwise actuated for changing the dividing ratio N of counter or frequency-divider 7.

However, in the described motor speed control circuit according to the prior art, changing the dividing ratio of counter 7 results in variation of the loop gain of the motor speed control circuit. In this connection, it is known to be a characteristic of phase-locked loop systems that the natural oscillation frequency and damping factor thereof are determined by the loop gain and time constant of the loop filter indicated at 3. Thus, when the dividing ratio of counter 7 is changed the loop gain is correspondingly changed with resulting variations in the natural oscillation frequency and damping factor. Such variations of the natural oscillation frequency and damping factor result in changes in the response speed and transient response characteristic of the system. Therefore, in a phonograph record player having its turntable drive motor controlled by the prior art motor speed control circuit or servo system shown on FIG. 1, the response speed and transient response characteristics of the servo system are varied with changes in the motor speed and, accordingly, the fidelities of reproduction are different when reproducing 45 rpm records and 33⅓ rpm records, respectively.

Generally, in accordance with this invention, the foregoing problem is avoided by varying a gain of a component of the phase-locked loop other than the frequency-divider or counter in accordance with changes in the dividing ratio of the frequency-divider so that the loop gain of the phase-locked loop, as a whole, is maintained substantially constant regardless of the rotational speed of the motor.

Figure 2:
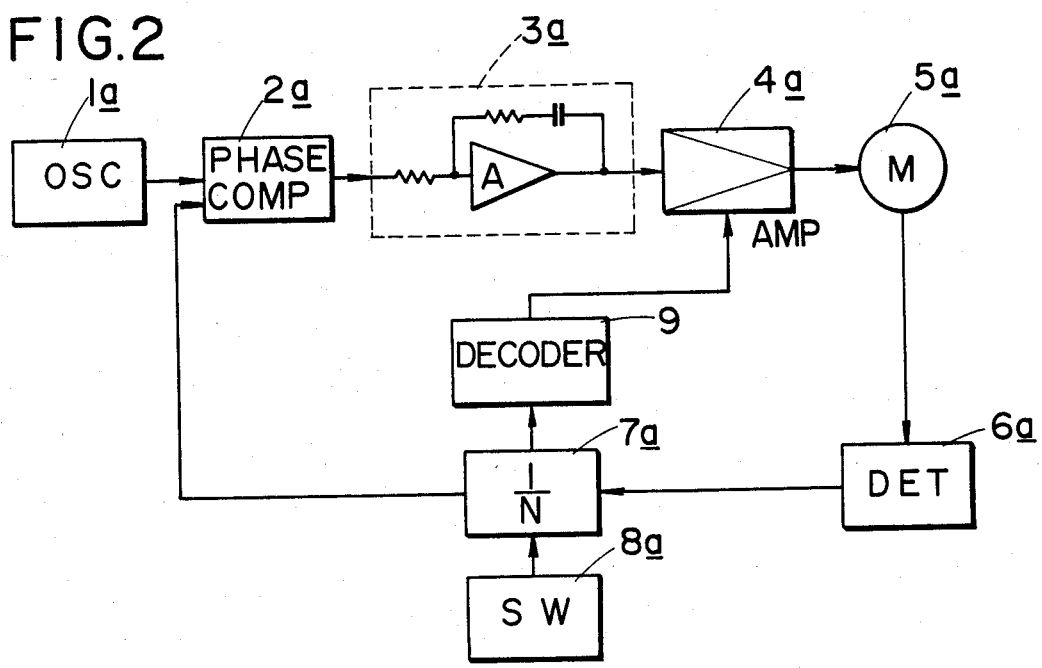
FIGS. 2, 3, 4 and 5 are views similar to FIG. 1 but showing various motor speed control circuits in accordance with respective embodiments of the present invention.

For example, as shown on FIG. 2, in which those components of a motor speed control circuit according to this invention corresponding to those described above with reference to FIG. 1 are identified by the same reference numerals but with the letter "a" appended thereto, the servo-amplifier 4a may be in the form of a variable gain amplifier and may be the component of the phase-locked loop which has its gain varied with changes in the dividing ratio. More particularly, in the embodiment of FIG. 2, a decoder 9 decodes a signal from counter or frequency-divider 7a in correspondence to the dividing ratio of the latter and provides a corresponding gain control voltage for amplifier 4a. Thus, the gain of servo-amplifier 4a is changed in accordance with the dividing ratio N of frequency-divider 7a and, as a result thereof, the overall loop gain of the phase-locked loop system is maintained constant regardless of the motor speed. As one example thereof, frequency-divider 7a may be of the type shown in U.S. Pat. No. 3,843,914. As another example, the frequency divider may be similar to that shown in U.S. Pat. No. 4,025,953. More particularly, the programmable frequency divider functions to divide the frequency of an oscillating signal supplied thereto by a selectable dividing ratio N. The frequency-divider may include a counter coupled to the output of detector 6, the output of this counter being coupled to a programmable comparator which compares the instantaneous count of the counter to a binary coded representation of the dividing ratio supplied by switch 8. Decoder 9 is connected to decode this binary coded dividing ratio which is supplied to the programmable comparator. The decoded binary coded dividing ratio N is a control voltage. Thus, decoder 9 generates an analog gain control voltage, and may be constructed as a digital-to-analog converter, various embodiments of which have been long known to the prior art. Of course, whenever the dividing ratio N is changed, the analog control voltage likewise is changed. If the dividing ratio N remains constant, then the corresponding control voltage produced by decoder 9 also remains constant.

Amplifier 4a may be a suitable gain-controlled amplifier, such as the amplifiers described at pages 285–286 of the text "FET Applications Handbook" by Jerome Eimbinder (1974) TAB Books; and at page 21 of the text "Circuit Design Idea Handbook" (1974) Cahners Publishing Company, Inc. These typical gain-controlled amplifiers are responsive to gain control voltages supplied thereto so as to adjust their gains, or amplifications. One of ordinary skill in the art would recognize that amplifier 4a could be constructed as such a typical gain-controlled amplifier.

Figure 3:
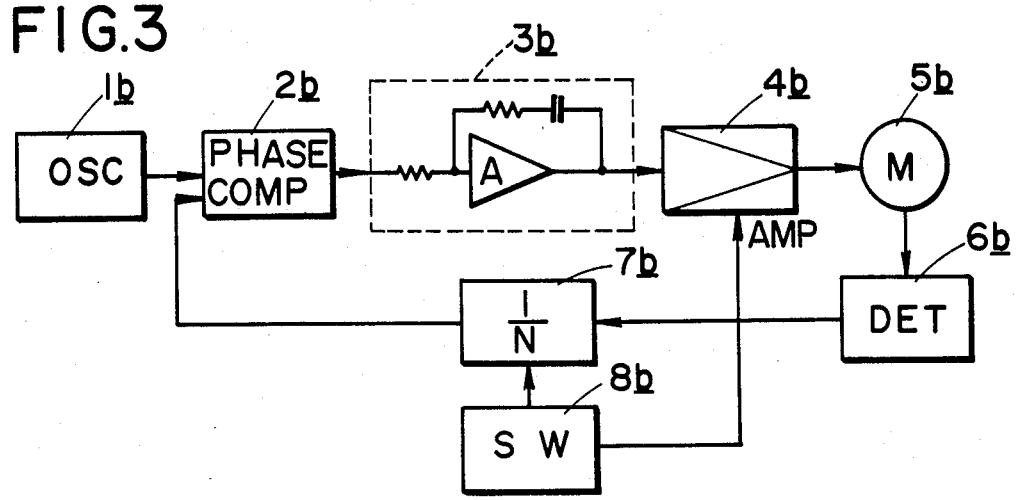

As shown on FIG. 3, in which the various components of the motor speed control circuit corresponding to those described above with reference to FIG. 1 are again identified by the same reference numerals, but with the letter "b" appended thereto, it will be seen that, in a motor control circuit according to another embodiment of this invention, the decoder 9 of FIG. 2 may be omitted and the gain of the variable gain servo-amplifier 4b may then be directly controlled by a gain control voltage from switch 8b which is suitably varied in response to actuation of the switch 8b for changing the dividing ratio of counter or frequency-divider 7b. The operation of switch 8b may be ganged with a suitable potentiometer or other adjustable resistance of amplifier 4b to vary the gain thereof. Alternatively, switch 8b may include a set of mechanically-ganged contacts that, when selectively closed, supplies a respective gain-controlling voltage to the amplifier.

Figure 4:
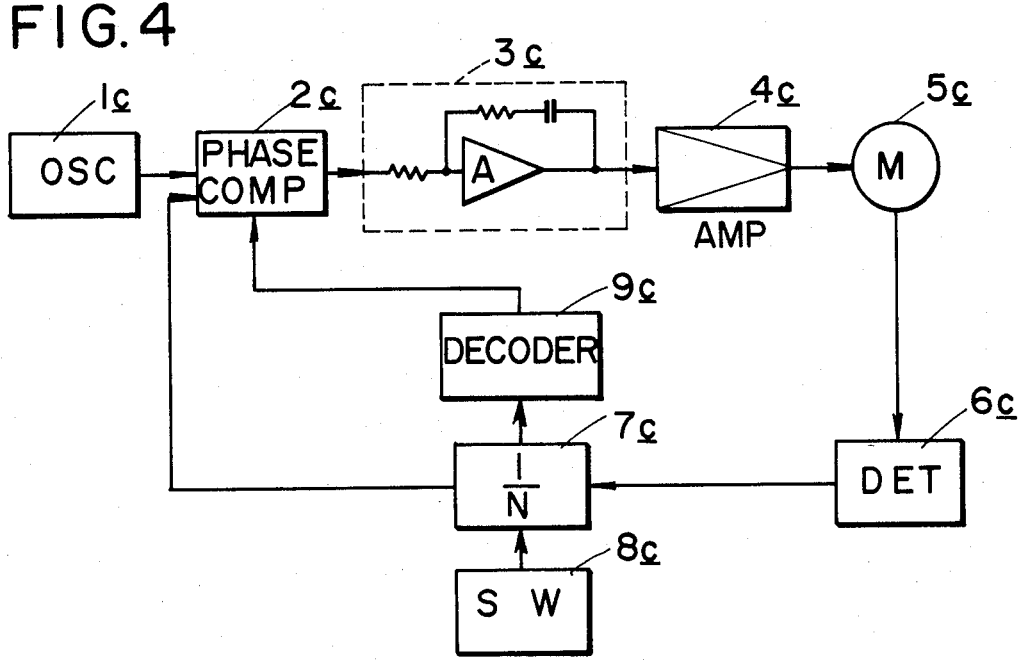

Although the embodiments of the present invention illustrated by FIGS. 2 and 3 maintain the loop gain of the phase-locked loop substantially constant regardless of the rotational speed of the motor by varying the gain of the servoamplifier 4a or 4b in accordance with changes in the dividing ratio of the frequency-divider, the gain of another of the components of the phase-locked loop can be similarly varied to achieve the same overall effect. Thus, as shown on FIG. 4 in which the various components of the control circuit are identified by the same reference numerals as on FIG. 2, but with the letter "c" appended thereto, the gain control voltage from decoder 9c may be applied to the phase comparator 2c for changing or varying a gain of the latter in a sense to maintain constant the loop gain of the servo system regardless of the motor speed. Phase comparator 2c, for example, may have the construction shown at, for example, page 472 of "Sourcebook of Electronic Circuits" by John Markus (1968), McGraw-Hill Inc.; or at pages 1 or 26 of "Electronics Handbook of Circuit Design" (1965), McGraw-Hill Inc. In these embodiments, the gain of the phase detector may be controlled, or established, by a suitable gain control voltage supplied thereto. For example, the various transistors in each of these phase detector circuits may have their amplifications, or gains, controlled by a gain control voltage produced by decoder 9c.

Figure 5:
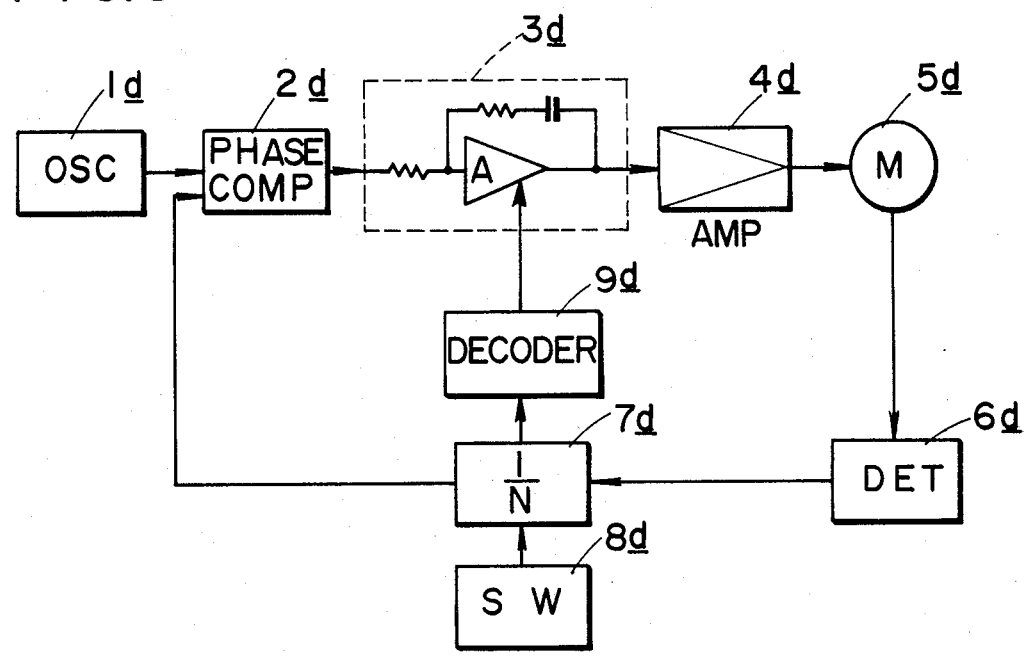

Similarly, as shown on FIG. 5, in which the various components of the control circuit according to this invention are identified by the same reference numerals as on FIG. 2, but with the letter "d" appended thereto, the gain control voltage from decoder 9d may be applied to the loop filter 3d for varying or controlling a gain of the latter in the sense to maintain constant the loop gain of the servo system regardless of changes in the motor speed. Loop filter 3d is an active filter having an amplifier A therein. Such amplifier could be a gain-controlled amplifier of the type known to the prior art, some examples of which have been described above. The gain of that amplifier is controlled by the control signal supplied thereto by decoder 9d.

Although the decoders 9a, 9c and 9d are shown to decode the binary coded dividing ratio N of the respective frequency-dividers 7a, 7c and 7d so as to provide a gain control signal varying with changes in the dividing ratio, it will be appreciated that each of the decoders 9, 9c and 9d could similarly decode the signal applied from the respective switch 8a, 8c or 8d of the frequency divider. Furthermore, if desired, the output of the detector 6a–6d could be converted from a pulse train, whose frequency is determined by the speed of motor 5, to a corresponding voltage, and this voltage may be used, rather than the output of the decoder 9a, 9c or 9d or the output of the switch 8b, to control the gain of the servo-amplifier 4a–4d, the phase comparator 2a–2d or the loop filter 3a–3d in the sense to maintain constant the loop gain of the servo system regardless of changes in the motor speed.

Having described in detail various embodiments of the present invention and modifications thereof with reference to the accompanying drawings, it is to be understood that the invention is not limited to those precise embodiments and modifications, and that further changes and variations may be effected therein by one skilled in the art without departing from the scope or spirit of the invention as defined in the appended claims.

What is claimed is:

1. In combination with an electric motor; a motor speed control circuit comprising a phase-locked loop composed of a plurality of components including means for producing a speed signal having a frequency proportional to the speed of said motor, a frequency-divider operative to divide said speed signal by a selected dividing ratio, a reference oscillator for supplying a reference oscillating signal, a phase comparator for comparing the phase of said reference oscillating signal to that of the frequency-divided speed signal and to produce an error signal as a function of the phase difference therebetween, filter means for filtering said error signal, and amplifier means for amplifying said filtered error signal to produce a motor control signal, said motor control signal being supplied to said motor; selecting means for selecting the dividing ratio of said frequency divider and thereby select the rotational speed of said motor; means for producing an output signal corresponding to said selected dividing ratio; and means for supplying said output signal to one of said phase comparator, filter means and amplifier means for varying the gain thereof in accordance with said dividing ratio of the frequency-divider to a value which compensates for changes in the overall gain of said loop resulting from changes in rotational speed of the motor so that said overall gain of said phase-locked loop is maintained substantially constant regardless of said rotational speed of the motor.

2. The combination of claim 1; in which said selecting means comprises switch means actuable for selecting said dividing ratio of the frequency divider.

3. The combination of claim 2; in which said output signal is supplied to said amplifier means.

4. The combination of claim 2; in which said output signal is supplied to said phase comparator.

5. The combination of claim 2; in which said output signal is supplied to said filter means, said filter means being constituted by an active RC filter.

6. The combination of claim 1; in which said selecting means comprises switch means actuable for changing said dividing ratio of the frequency-divider and said means for producing an output signal comprises a decoder for producing a control voltage varying with changes in said dividing ratio.

7. The combination of claim 1; in which said motor is a turntable drive motor of a phonograph record player, and said dividing ratio of the frequency-divider is changeable between first and second values thereof which respectively correspond to turntable speeds of 45 rpm and $33\frac{1}{3}$ rpm for said record player.

* * * * *